(12) United States Patent
Kamiya

(10) Patent No.: US 10,801,613 B2
(45) Date of Patent: Oct. 13, 2020

(54) VEHICLE LOCK-UP CLUTCH CONTROL DEVICE

(71) Applicants: JATCO Ltd, Fuji-shi, Shizuoka (JP); NISSAN MOTOR CO., LTD., Yokohama-shi, Kanagawa (JP)

(72) Inventor: Kohei Kamiya, Yamato (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 131 days.

(21) Appl. No.: 16/308,434

(22) PCT Filed: May 19, 2017

(86) PCT No.: PCT/JP2017/018778
§ 371 (c)(1),
(2) Date: Dec. 7, 2018

(87) PCT Pub. No.: WO2017/212894
PCT Pub. Date: Dec. 14, 2017

(65) Prior Publication Data
US 2019/0271392 A1    Sep. 5, 2019

(30) Foreign Application Priority Data
Jun. 10, 2016 (JP) ................... 2016-116129

(51) Int. Cl.
*F16H 61/14* (2006.01)
*F16D 48/06* (2006.01)
(Continued)

(52) U.S. Cl.
CPC ........... *F16H 61/143* (2013.01); *F16D 48/06* (2013.01); *F16D 2500/10412* (2013.01);
(Continued)

(58) Field of Classification Search
None
See application file for complete search history.

(56) References Cited

U.S. PATENT DOCUMENTS 5,667,458 A * 9/1997 Narita .................. F16H 61/143
477/118
7,189,185 B2 * 3/2007 Schlecht ............... B60W 30/18
477/54

(Continued)

FOREIGN PATENT DOCUMENTS

| JP | 2003-097696 A | 4/2003 |
| JP | 2008-121750 A | 5/2008 |
| JP | 2016-017622 A | 2/2016 |

*Primary Examiner* — Timothy Hannon
(74) *Attorney, Agent, or Firm* — Foley & Lardner LLP

(57) ABSTRACT

Provided is a lock-up clutch control device of a vehicle in which a torque converter with a lock-up clutch is disposed between an engine and a transmission. This control device has a coasting capacity learning control section configured to decrease a LU differential pressure command value for the lock-up clutch during accelerator release operation and, when a slip of the lock-up clutch is detected during decrease of the LU differential pressure command value, update the LU differential pressure command value at the time of detection of the slip as a LU differential pressure learning value balanced with a coasting torque. The coasting capacity learning control section is further configured to, when operation of the PTC heater intervenes during coasting capacity learning control, correct the LU differential pressure command value by adding thereto a LU differential pressure correction value that corresponds to an increase of input torque to the lock-up clutch.

5 Claims, 11 Drawing Sheets

(51) Int. Cl.
*F16H 59/18* (2006.01)
*F16H 61/00* (2006.01)

(52) U.S. Cl.
CPC ............... *F16D 2500/3065* (2013.01); *F16D 2500/30406* (2013.01); *F16D 2500/3144* (2013.01); *F16D 2500/3161* (2013.01); *F16D 2500/5085* (2013.01); *F16D 2500/50251* (2013.01); *F16D 2500/70426* (2013.01); *F16D 2500/70458* (2013.01); *F16D 2500/70605* (2013.01); *F16H 2059/186* (2013.01); *F16H 2061/0087* (2013.01); *F16H 2061/145* (2013.01); *Y02T 10/76* (2013.01)

(56) References Cited

U.S. PATENT DOCUMENTS

| | | | |
|---|---|---|---|
| 2003/0060330 A1 | 3/2003 | Sato et al. | |
| 2014/0373809 A1* | 12/2014 | Kawamoto | F16H 63/50 123/332 |
| 2018/0266549 A1* | 9/2018 | Tohta | F16H 61/143 |

* cited by examiner

VEHICLE LOCK-UP CLUTCH CONTROL DEVICE

CROSS-REFERENCE TO RELATED APPLICATIONS

This application is a National Phase of International Patent Application No. PCT/JP2017/018778, filed May 19, 2017, which claims priority to Japanese Patent Application No. 2016-116129, filed Jun. 10, 2016. The contents of these applications are herein incorporated by reference in their entirety.

TECHNICAL FIELD

The present invention relates to a vehicle lock-up clutch control device for performing learning control of a coasting lock-up capacity balanced with a coasting torque during coasting of a vehicle with an accelerator pedal released.

BACKGROUND ART

There is conventionally known a device for performing learning control to obtain a lock-up differential pressure learning value, that is, a coasting lock-up capacity balanced with a coasting torque during coasting of a vehicle with an accelerator pedal released. It is common to perform such coasting capacity learning control during the execution of a smooth lock-up release control process in which the lock-up clutch is released from engagement by gradually decreasing the engaging capacity of the lock-up clutch (see, for example, Patent Document 1).

In the above conventional device, however, the absolute value of the torque inputted from the engine to the lock-up clutch is increased when there takes place an intervention of engine auxiliary equipment load (such as operation of PTC heater) under the coasting capacity learning control. This causes a slip of the lock-up clutch in a slight lockup state. In the case where the occurrence of a slip of the lock-up clutch is set as a condition for completing the coasting capacity learning control, the conventional device faces the problem of erroneously learning, as the lock-up differential pressure learning value, a lock-up differential pressure command value at the time of detection of the slip caused due to the intervention of engine auxiliary equipment load. On the other hand, the conventional device faces the problem of loss of learning opportunities in the case where the occurrence of a variation of input torque caused due to the intervention of engine auxiliary equipment load is set as a condition for completing the coasting capacity learning control.

PRIOR ART DOCUMENTS

Patent Documents

Patent Document 1: Japanese Laid-Open Patent Publication No. 2016-17622

SUMMARY OF THE INVENTION

The present invention has been made in view of the above problems. It is an object of the present invention to provide a technique for, even when there takes place an intervention of engine auxiliary equipment load under coasting capacity learning control, not only preventing erroneous learning due to a slip of a lock-up clutch but also preventing loss of learning opportunities.

To achieve the above object, the present invention provides a lock-up clutch control device of a vehicle in which a torque converter with a lock-up clutch is disposed between an engine and a transmission. The control device executes control processing of generating a command value for decreasing a lock-up engaging force of the lock-up clutch during accelerator release operation. The control device has a coasting capacity learning control section configured to, when a slip of the lock-up clutch is detected during decrease of the command value, update the command value at the time of detection of the slip as a lock-up learning value balanced with a coasting torque. The coasting capacity learning control section is further configured to, when an intervention of engine auxiliary equipment load takes place under coasting capacity learning control, correct the command value by adding thereto a lock-up pressure correction value that corresponds to an increase of input torque to the lock-up clutch.

The command value is corrected by adding thereto the lock-up pressure correction value when the intervention of engine auxiliary equipment load takes place under the coasting capacity learning control. This correction increases the engaging capacity of the lock-up clutch so as to, even when the input torque to the lock-up clutch is increased with the intervention of engine auxiliary equipment load during the coasting capacity learning control, suppress the occurrence of a slip of the lock-up clutch due to the intervention of engine auxiliary equipment load.

It is therefore possible in the present invention to, even when there takes place an intervention of engine auxiliary equipment load under the coasting capacity learning control, prevent erroneous learning due to a slip of the lock-up clutch and prevent loss of learning opportunities.

DETAILED DESCRIPTION OF THE EMBODIMENTS

As the best mode for carrying out the present invention, a vehicle lock-up clutch control device according to Embodiment 1 will be described below with reference to the drawings.

Embodiment 1

The configurations of the lock-up clutch control device will be first explained below.

The lock-up clutch control device according to Embodiment 1 is applied to an engine vehicle having a PTC (positive temperature coefficient) heater as a heating device.

Hereinafter, explanations of the lock-up clutch control device of the PTC heater-equipped engine vehicle according to Embodiment 1 will be given under the headings of "Overall System Configuration" and "Coasting Capacity Learning Control Process". In the following description, "LU" is used as an abbreviation for "lock-up"; and "ENG" or "Eng" is used as an abbreviation for "engine".

[Overall System Configuration]

Figure 1:
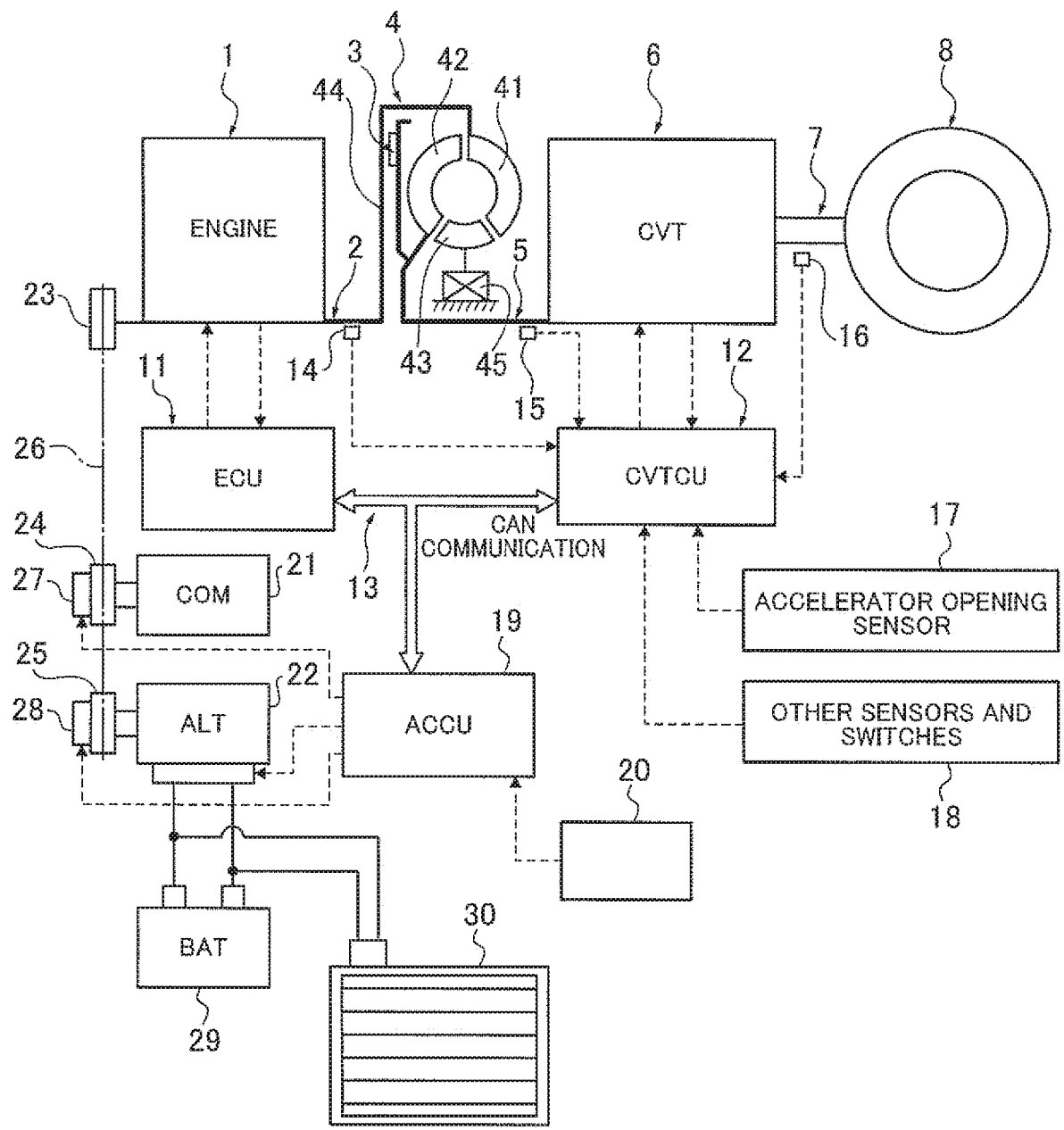
FIG. 1 is an overall system diagram of a PTC heater-equipped engine vehicle to which a lock-up clutch control device according to Embodiment 1 is applied.

FIG. 1 is an overall system diagram of the PTC heater-equipped engine vehicle with the lock-up clutch control device according to Embodiment 1. The overall system configuration of the engine vehicle will be now explained in detail below with reference to FIG. 1.

As shown in FIG. 1, the engine vehicle has a drive system equipped with an engine 1, an engine crankshaft 2, a lock-up clutch 3, a torque converter 4, a transmission input shaft 5, a continuously variable transmission 6 (as a transmission), a drive shaft 7 and drive wheels 8.

The lock-up clutch 3 is built in the torque converter 4 such that the engine 1 and the continuously variable transmission 6 are connected to each other through the torque converter 4 by release of the clutch and such that the engine crankshaft 2 and the transmission input shaft 5 are directly connected to each other by engagement of the clutch. The engagement/slip engagement/release of the lock-up clutch 3 is controlled by means of a LU actual hydraulic pressure, which is generated based on a LU differential pressure command value from the after-mentioned CVT control unit 12.

The torque converter 4 includes a pump impeller 41, a turbine runner 42 opposed to the pump impeller 41 and a stator 43 arranged between the pump impeller 41 and the turbine runner 42. The torque converter 4 is a hydraulic coupling filled with a hydraulic oil and adapted to allow torque transmission by circulation of the hydraulic oil to the respective blades of the pump impeller 41, the turbine runner 43 and the stator 43. The pump impeller 41 is coupled at an inner surface thereof to the engine output shaft 2 through a converter cover 44, which defines an engagement surface for the lock-up clutch 3. The turbine runner 52 is coupled to the transmission input shaft 5. The stator 43 is disposed on a stationary member (such as transmission case) through a one-way clutch 45.

The continuously variable transmission 6 is a transmission having a belt-type continuously variable transmission mechanism that continuously controls a transmission ratio by changing a contact radius of a belt with primary and secondary pulleys. The controlled transmission output rotation is transmitted to the drive wheels 8 through the drive shaft 7. The continuously variable transmission 6 may be a transmission only with a belt-type continuously variable transmission mechanism or a transmission with a continuously variable transmission mechanism and a sub-transmission mechanism.

The engine vehicle has a control system equipped with an engine control unit 11, a CVT control unit 12, an AC control unit 19 and a CAN communication line 13 as shown in FIG. 1. The engine control unit 11, the CVT control unit 12 and the AC control unit 19 are connected to one another by the CAN communication line 13 for interactive information communication.

The engine control unit 11 is configured to execute control processing including fuel injection control to control the amount of fuel injected to the engine 1 according to an accelerator depression amount during accelerator depression operation, fuel-cut control to cut off fuel injection to each cylinder of the engine 1, and the like. An engine torque signal is generated by estimation operation and sent from the engine control unit 11 to the CVT control unit 12 through the CAN communication line 13.

The CVT control unit 12 is configured to receive information from an engine rotation sensor 14, a turbine rotation sensor 15 (=transmission input rotation sensor), a transmission output rotation sensor 6 (=vehicle speed sensor), an accelerator opening sensor 17 and other sensors and switches 18, and then, execute control processing including not only transmission ratio control of the continuously variable transmission 6 but also smooth LU release control of the lock-up clutch 3, coasting capacity learning control of the lock-up clutch 3, and the like. The smooth LU release control is to, when the vehicle speed becomes lower than a LU release vehicle speed during deceleration with the accelerator pedal released, gradually decrease the engaging capacity of the lock-up clutch 3 and thereby shift the lock-up clutch 3 from engagement to release. The coasting capacity learning control is to, while gradually decreasing the engaging capacity of the lock-up clutch during coasting, obtain the deviation between the engine rotation speed and the turbine rotation speed, that is, the LU differential pressure command value at the occurrence of a slip rotation speed as a lock-up differential pressure learning value balanced with the engine torque (i.e. coasting torque negative in value).

The AC control unit 19 is configured to receive information from other sensors and switches 20 such as AC switch and control air conditioning (air volume and temperature) in the interior of the vehicle. On the basis of control commands from the AC control unit 19, engine auxiliary equipment including a compressor 21 and an alternator 22 is operated. The compressor 21 and the alternator 22 are drivable by the engine crankshaft 2 of the engine 1 through pulleys 23, 24 and 25 (or sprockets) and a belt 26. More specifically, the compressor 21 is driven by the engine crankshaft 2 when an electromagnetic clutch 27 is engaged based on the control command from the AC control unit 19. The driving of the compressor 21 causes engine auxiliary equipment load. Further, the alternator 22 is driven by the engine crankshaft 2 when an electromagnetic clutch 28 is engaged based on the control command from the AC control unit 19. The driving of the alternator 22 also causes engine auxiliary equipment load. In the case where the alternator 22 is driven in a low battery state, a vehicle-mounted battery 29 is charged with the power generated by the alternator 22. In the case where the alternator 22 is driven in response to a heating request, the power generated by the alternator 22 is supplied to a PTC heater 30 while the charge amount of the vehicle-mounted battery 29 is maintained at a predetermined level.

The PTC heater 30 is a heating device for heating blower air. Herein, the PTC heater 30 is provided with three heating wires (e.g. 333 w×3 pieces) and has three operation stages (first, second and third stages). In view of the fact that the alternator 22 is driven in accordance with the operation of the PTC heater 30, the engine auxiliary equipment load increases as the heater operation stage shifts from the first stage to the second stage and then to the third stage. The information about the heater operation stage is transmitted from the AC control unit 19 to the CVT control unit 12 through the CAN communication line 13.

[Coasting Capacity Learning Control Process]

Figure 2:
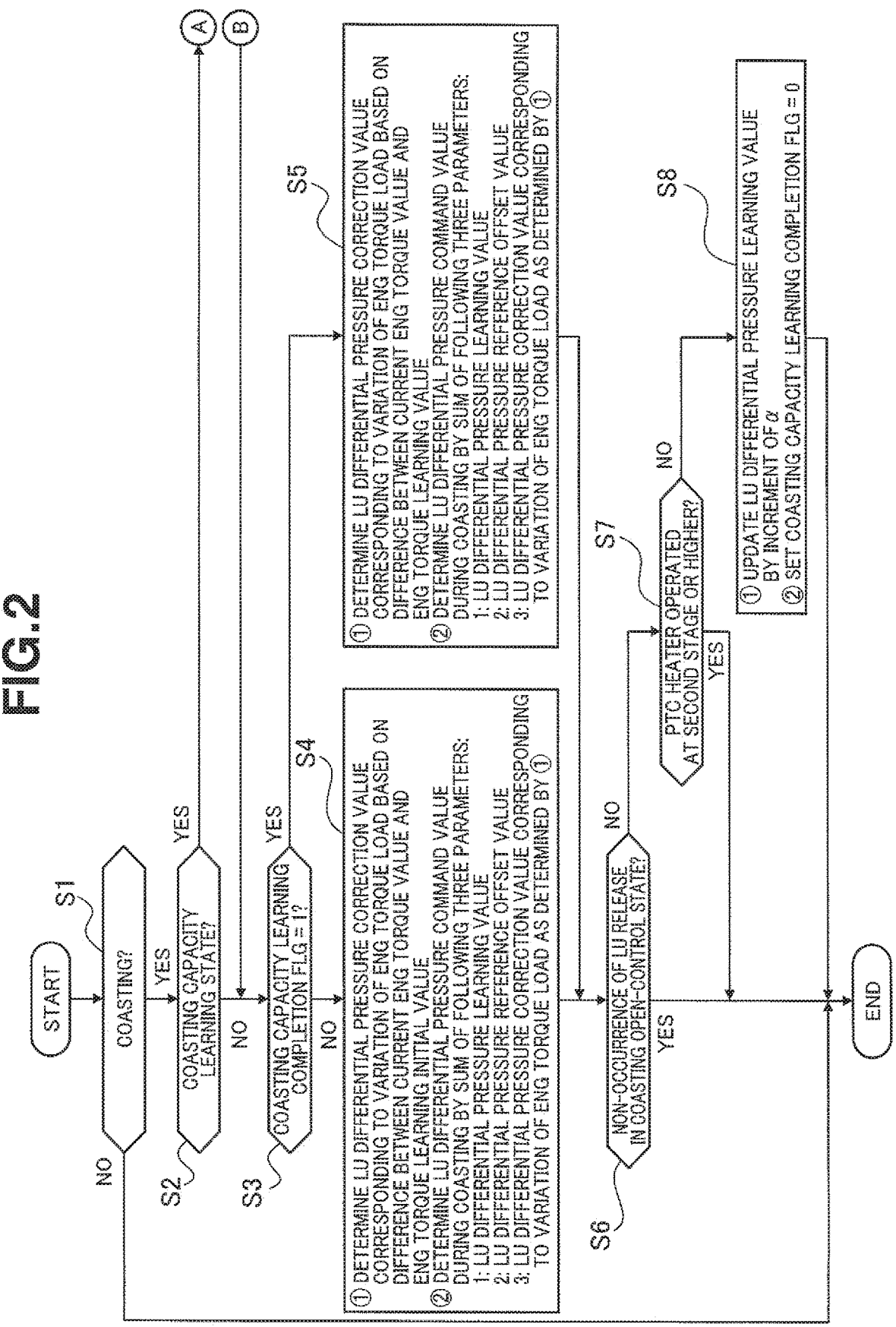
FIG. 2 is a flowchart 1 of a coasting capacity learning control process executed by a CVT control unit of the lock-up clutch control device according to Embodiment 1.
Figure 3:
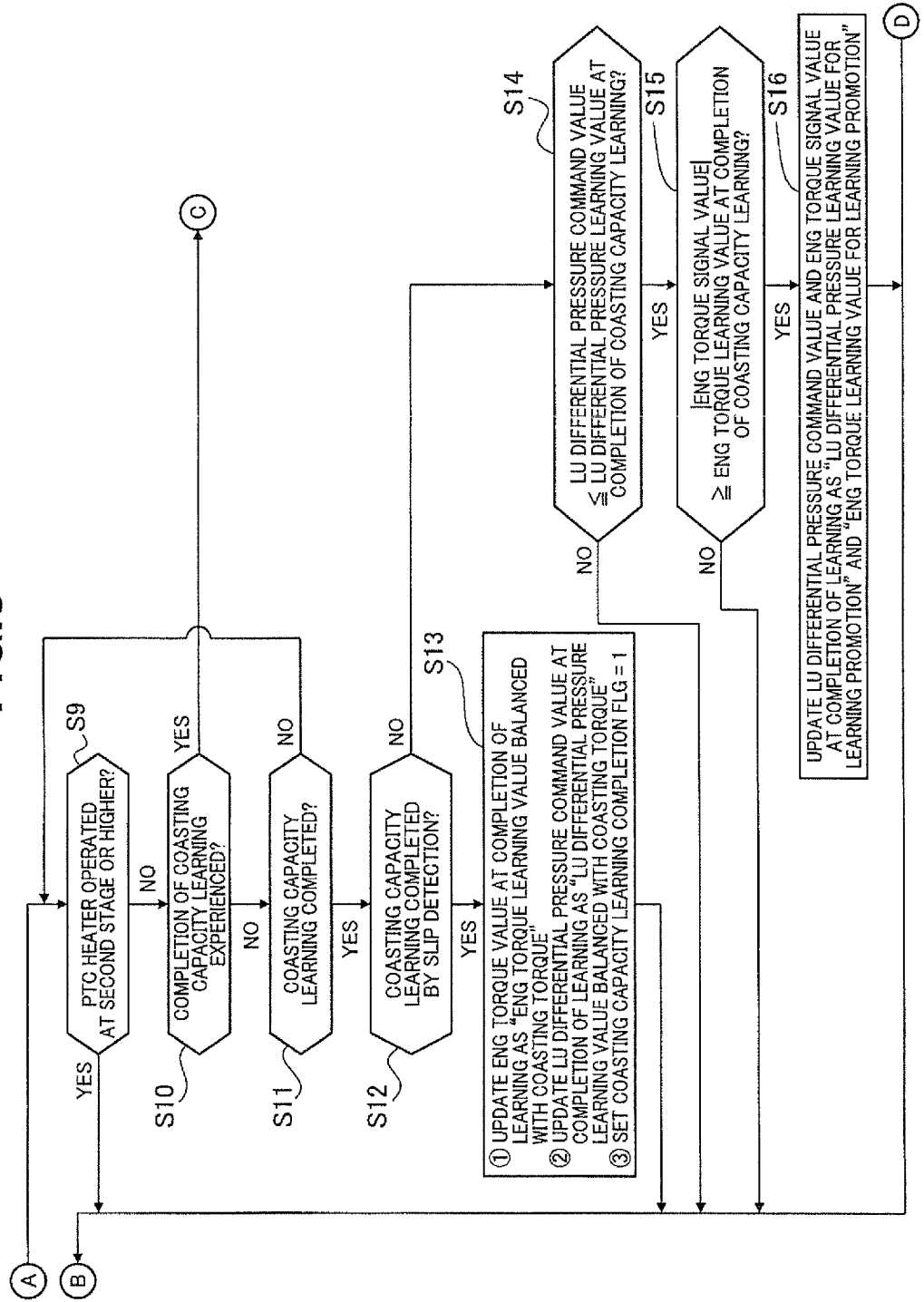
FIG. 3 is a flowchart 2 of the coasting capacity learning control process executed by the CVT control unit of the lock-up clutch control device according to Embodiment 1.
Figure 4:
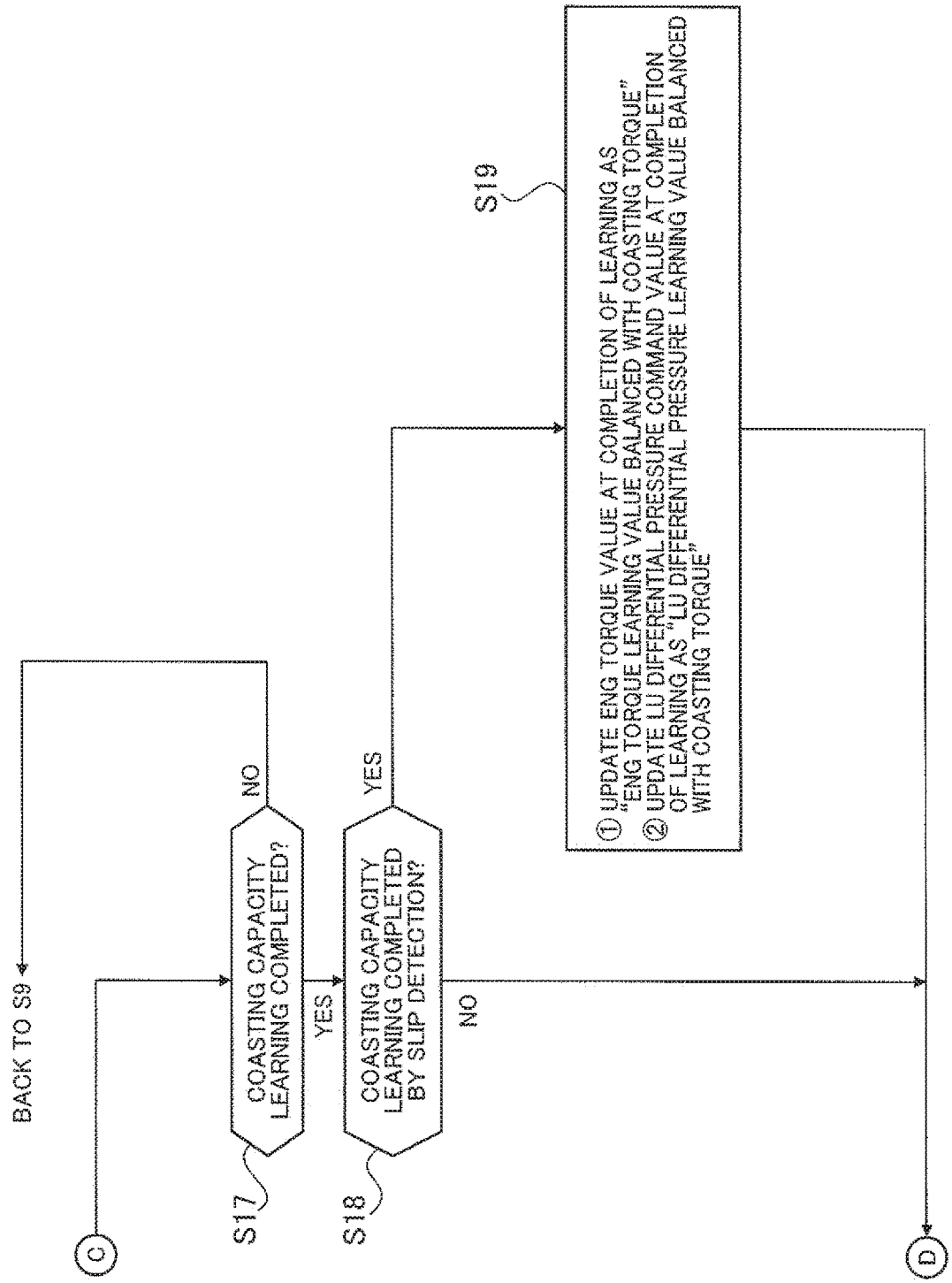
FIG. 4 is a flowchart 3 of the coasting capacity learning control process executed by the CVT control unit of the lock-up clutch control device according to Embodiment 1.

FIGS. 2 to 4 are flowcharts of a coating capacity learning control process (as a coasting capacity learning control section) executed by the CVT control unit 12 in Embodiment 1. The respective steps of the coasting capacity learning control process of FIGS. 2 to 4 will be explained in detail below.

In step S1, it is judged whether the vehicle is in a coasting state (coast running state) with the accelerator pedal released. When Yes in step S1 (the vehicle is coasting), the process proceeds to step S2. When No in step S1 (the vehicle is running with the accelerator pedal depressed), the process proceeds to the end.

Subsequent to the judgment of the vehicle coasting in step S1, it is judged in step S2 whether the control unit is in the execution of coasting capacity learning (=coasting capacity learning state). When Yes in step S2 (the control unit is in a coasting capacity learning state), the process proceeds to step S9. When No in step S2 (the control unit is in a coasting open-control state), the process proceeds to step S3.

Figure 5:
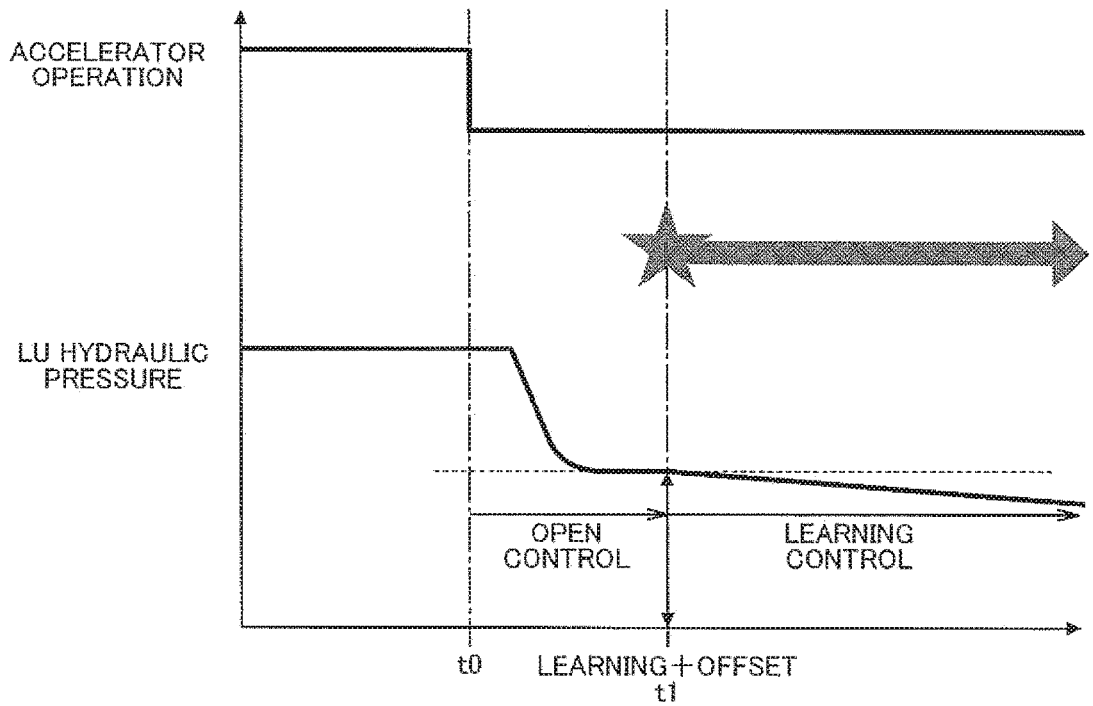
FIG. 5 is a time chart showing a shift between a coasting open-control state and a coasting capacity learning state in the coasting capacity learning control process of Embodiment 1.

The coasting open-control state corresponds to a period from accelerator release time t0 to target value attainment time t1 in FIG. 5. More specifically, the coasting open-control state refers to a period in which, when the coasting capacity learning control process is started with accelerator release operation, the control unit decreases the LU differential pressure command value for the lock-up clutch 3 to a target value, which is determined by adding a differential pressure reference offset value to a LU differential pressure learning value, by open control so as to control the LU hydraulic pressure to its target value, and then, maintains the target LU differential pressure command value.

The execution of coasting capacity learning (=coasting capacity learning state) corresponds to a period after the target value attainment time t1 in FIG. 5. More specifically, the coasting capacity learning state refers to a period in which, upon satisfaction of a coasting capacity learning condition under the status that the LU hydraulic pressure has reached its target value by the open control, the control unit gradually decreases the LU differential pressure command value with a gentle gradient and detects the occurrence of a slip of the lock-up clutch 3 during the decrease of the LU differential pressure command value.

Subsequent to the judgment of the coasting open-control state in step S2, the judgment of No in step S14 or step S15 or the update of the learning value in step S13 or step S16, it is further judged in step S3 whether the "coasting capacity learning completion FLG" is set to 1 or not. When Yes in step S3 ("coasting capacity learning completion FLG"=1), the process proceeds to step S5. When No in step S3 ("coasting capacity learning completion FLG"=0), the process proceeds to step S4.

When "coasting capacity learning completion FLG"=0, it means that completion of the learning by detection of a slip of the lock-up clutch has not been experienced in the coasting capacity learning control process. (In this case, LU differential pressure and ENG torque learning initial values are used.) When "coasting capacity learning completion FLG"=1, it means that completion of the learning by detection of a slip of the lock-up clutch has already been experienced in the coasting capacity learning control process. (In this case, the LU differential pressure and ENG torque learning values have been obtained.)

The LU differential pressure command value during the coasting is determined in step S4 subsequent to the judgment of "coasting capacity learning completion FLG"=0 in step S3. The process then proceeds to step S6.

Figure 6:
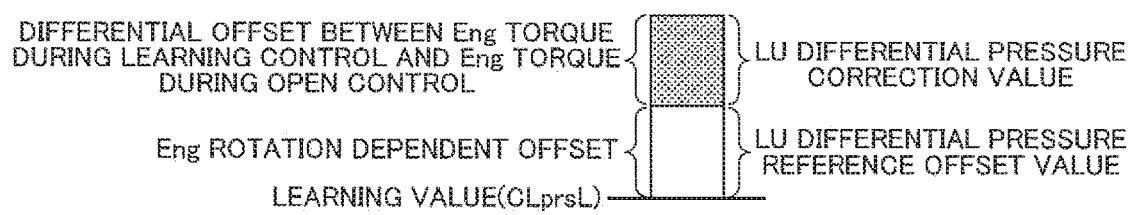
FIG. 6 is a schematic view showing the determination of a lock-up differential pressure command value by adding a rotation speed-dependent offset and a torque-dependent offset to a differential pressure learning value in the coasting capacity learning control process of Embodiment 1.

In the case of "coasting capacity learning completion FLG=0", the LU differential pressure command value during the coasting is determined by the following equation: LU differential pressure command value=LU differential pressure learning value+LU differential pressure reference offset value+LU differential pressure correction value (see FIG. 6). The LU differential pressure correction value, which corresponds to a variation of ENG torque load, is determined as a difference between the current ENG torque value and the ENG torque learning initial value.

The LU differential pressure command value during the coasting is determined in step S5 subsequent to the judgment of "coasting capacity learning completion FLG"=1 in step S3. The process then proceeds to step S6.

In the case of "coasting capacity learning completion FLG"=1, the LU differential pressure command value during the coasting is determined by the following equation: LU differential pressure command value=LU differential pressure learning value+LU differential pressure reference offset value+LU differential pressure correction value (see FIG. 6). The LU differential pressure correction value, which corresponds to a variation of ENG torque load, is determined as a difference between the current ENG torque value and the ENG torque learning value.

Subsequent to the determination of the coasting LU differential pressure command value in step S4 or step S5, it is judged in step S6 whether there is no occurrence of LU release in the coasting open-control state. When Yes in step S6 (no LU release is occurring), the process proceeds to the end. When No in step S6 (LU release is occurring), the process proceeds to step S7.

The LU release refers to a phenomenon where, even though the LU differential pressure command value at which a slip the lock-up clutch 3 should not occur during coasting is set in step S4 or step S5 under the coasting open-control state, the lock-up clutch 3 shows a given amount of slip due to a large deviation of the estimated LU differential pressure command value at which a slip of the lock-up clutch should not occur during coasting (i.e. a large deviation of the "LU differential pressure learning value") under the input of a large load torque from the engine side by operation of the PTC heater 30 etc.

Figure 7:
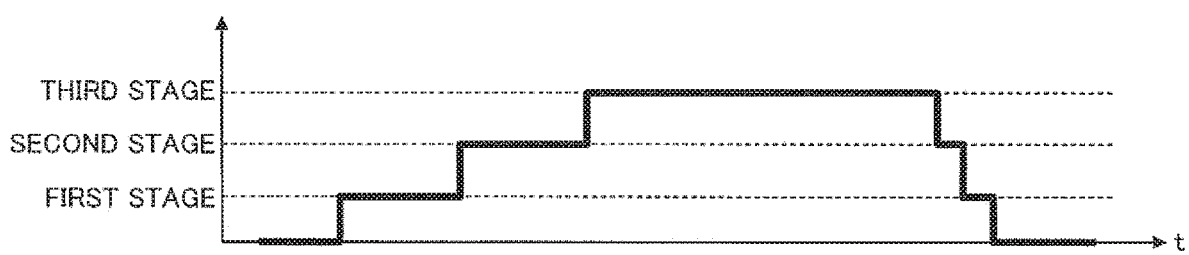
FIG. 7 is a time chart showing an example of operation of a PTC heater, with the target set at the third stage, in the coasting capacity learning control process of Embodiment 1.

Subsequent to the judgment of the LU release in step S6, it is judged in step S7 whether the operation stage of the PTC heater 30 is the second or higher stage. When Yes in step S7 (the PTC heater is operated at the second or higher stage), the process proceeds to the end. When No in step S7 (the PTC heater is at the first or lower stage), the process proceeds to step S8. In the case of operating the PTC heater 30 with the target set at the third stage, the heater operation stage shifts from the first stage to the second stage and then to the third stage in a stepwise manner at given time intervals as shown in FIG. 7. The engine auxiliary equipment load increases with such shift of the heater operation stage.

In step S8 subsequent to the judgment of the first or lower operation stage of the PCT heater in step S7, the LU differential pressure learning value is updated to a higher value by an increment of "α (where α is an arbitrary value)"; and the "coasting capacity learning completion FLG" is set to 0. The process then proceeds to the end.

The update of the LU differential pressure learning value by an increment of "α" enables correction of the learning value so as to prevent LU release from occurring due to a slip of the lock-up clutch 3 during the next control. The setting of "coasting capacity learning completion FLG"=0 enables, in view of the possibility of deviations of the ENG torque learning value and the LU differential pressure learning value, resetting of such learning value deviations. In the case where there is a large load variation during the second- or higher-stage operation of the PCT heater, however, the LU differential pressure learning value is not corrected because the correction of the LU differential pressure learning value by an increment of "α" may result in a large deviation of the corrected learning value from the true learning value.

Subsequent to the judgment of the coasting capacity learning state in step S2 or the judgment of the coasting capacity learning state in step S11 or step S17, it is judged in step S9 whether the operation stage of the PTC heater 30 is the second or higher stage. When Yes in step S9 (the PCT heater is operated at the second or higher stage), the process proceeds back to step S3. When No in step S9 (the PCT heater is at the first or lower stage), the process proceeds to step S10.

Subsequent to the judgment of the first or lower operation stage of the PTC heater in step S9, it is judged in step S10 whether completion of the coasting capacity learning state has been experienced or not. When Yes in step S10 (completion of the coasting capacity learning has been experienced), the process proceeds to step S17. When No in step S10 (completion of the coasting capacity learning has not been experienced), the process proceeds to step S11. The presence or absence of experience of completion of the coasting capacity learning is judged by checking whether the "coasting capacity learning completion FLG" is set to "1 (experience of learning completion)" or "0 (no experience of learning completion)".

In step S11 subsequent to the judgment of no experience of completion of the coasting capacity learning state in step S10, it is further judged whether the coasting capacity learning has been completed or not in the coasting capacity learning state. When Yes in step S11 (the coasting capacity learning has been completed), the process proceeds to step S12. When No in step S11, (the coasting capacity learning is in progress), the process proceeds back to step S9.

Herein, the control is performed so as to gradually decrease the LU differential pressure command value determined in step S4 (=LU differential pressure learning value+ differential pressure reference offset value) in the case where no operation of the PTC heater 30 takes place in the coasting capacity learning state. In the case where the first-stage operation of the PTC heater 30 takes place during the coasting capacity learning state, on the other hand, the correction is additionally performed such that the LU differential pressure correction value corresponding to a variation of ENG torque load is added to the gradually decreasing LU differential pressure command value.

In the coasting capacity learning state, the learning control is completed at the timing where the slip of the lock-up clutch 3 is detected. The learning control may be completed by coasting capacity learning prohibition judgment with the lock-up clutch 3 engaged or may be completed upon shift to LU release by LU release judgement in the coasting capacity learning state.

Subsequent to the judgment of the completion of the coasting capacity learning in step S11, it is judged in step S12 whether the coasting capacity learning control has been completed by detection of a slip of the lock-up clutch. When Yes in step S12 (the learning control has been completed by slip detection), the process proceeds to step S13. When No in step S12 (the learning control has been completed by any reason other than slip detection), the process proceeds to step S14.

In step S13 subsequent to the judgement of the completion of the learning control by slip detection in step S12, the value of the ENG torque at the completion of the learning control is updated as the "ENG torque learning value balanced with the coasting torque"; and the LU differential pressure command value at the completion of the learning control is updated as the "LU differential pressure learning value balanced with the coasting torque". Further, the "coasting capacity learning completion FLG" is set to 1. The process then proceeds to step S3.

In step S14 subsequent to the judgement of the completion of the learning control by any reason other than slip detection in step S12, it is judged whether the condition of LU differential pressure command value ≤ "current LU differential pressure learning value" is satisfied or not at the completion of the coasting capacity learning control. When Yes in step S14 (LU differential pressure command value ≤ current LU differential pressure learning value), the process proceeds to step S15. When No in step S14 (LU differential pressure command value>current LU differential pressure learning value), the process proceeds back to step S3.

Subsequent to the judgment of LU differential pressure command value≤LU differential pressure learning value in step S14, it is further judged in step S15 whether the condition of |ENG torque signal value|≥"current ENG torque learning value" is satisfied or not at the completion of the coasting capacity learning control. When Yes in step S15 (|ENG torque signal value|≥current ENG torque learning value), the process proceeds to step S16. When No in step S15 (|ENG torque signal value|<current ENG torque learning value), the process proceeds back to step S3.

In step S16 subsequent to the judgment of |ENG torque signal value|≥ENG torque learning value in step S15, the LU differential pressure command value at the completion of the learning control is updated as the "LU differential pressure learning value for learning promotion"; and the value of the ENG torque signal at the completion of the learning control is updated as the "ENG torque learning value for learning promotion". The process then proceeds back to step S3.

In step S17 subsequent to the judgment of the experience of the completion of the coasting capacity learning state in step S10, it is judged whether the coasting capacity learning has been completed or not in the same manner as in step S11. When Yes in step S17 (the coasting capacity learning has been completed), the process proceeds to step S18. When No in step S17 (the coasting capacity learning is in progress), the process proceeds back to step S9.

Subsequent to the judgment of the completion of the coasting capacity learning in step S17, it is judged in step S18 whether the coasting capacity learning control has been completed by detection of a slip of the lock-up clutch in the same manner as in step S12. When Yes in step S18 (the learning control has been completed by slip detection), the process proceeds to step S19. When No in step S18 (the learning control has been completed by any reason other than slip detection), the process proceeds back to step S3.

Herein, the control is performed to gradually decrease the LU differential pressure command value determined in step S5 (=LU differential pressure learning value+differential pressure reference offset value) in the case where there takes place no operation of the PTC heater 30 in the coasting capacity learning state. In the case where the first-stage operation of the PTC heater 30 takes place during the coasting capacity learning state, on the other hand, the correction is additionally performed such that the LU differential pressure correction value corresponding to a variation of ENG torque load is added to the gradually decreasing LU differential pressure command value.

In step S19 subsequent to the judgement of the completion of the learning control by slip detection in step S18, the value of the ENG torque at the completion of the learning control is updated as the "ENG torque learning value balanced with the coasting torque"; and the LU differential pressure command value at the completion of the learning control is updated as the "LU differential pressure learning value balanced with the coasting torque". The process then proceeds to step S3.

Next, the operations of the lock-up clutch control device of Embodiment 1 will be explained below under the headings of "Coasting Capacity Learning Control Procedure", "Comparative Example and its Problems", "Concepts of LU Differential Pressure Correction Value and Coasting Capacity Learning", "Coasting Capacity Learning Control Operations" and "Features of Coasting Capacity Learning Control Process".

[Coasting Capacity Learning Control Procedure]

In the case where the "coasting capacity learning completion FLG" is set to 0 in the coasting open-control state without the occurrence of LU release, the process repeatedly proceeds through step S1→step S2→step S3→step S4→step S6 and then proceeds to the end in the flowchart of FIG. 2. At the time when a delay time has elapsed from the accelerator release operation, the open control of the LU differential pressure command value is carried out so that the LU hydraulic pressure, which is based on the LU differential pressure command value determined in step S4, is controlled to its target value by abruptly decreasing the LU differential pressure command value to the level at which a slip of the lock-up clutch 3 does not occur.

In the case where the "coasting capacity learning control completion FLG" is set to 1 in the coasting open-control state without the occurrence of LU release, the process repeatedly proceeds through step S1→step S2→step S3→step S5→step S6 and then proceeds to the end in the flowchart of FIG. 2. At the time when a delay time has elapsed from the accelerator release operation, the open control of the LU differential pressure command value is carried out so that the LU hydraulic pressure, which is based on the LU differential pressure command value determined in step S5, is controlled to its target value by abruptly decreasing the LU differential pressure command value to the level at which a slip of the lock-up clutch 3 does not occur.

In the case where LU release occurs in the coasting open-control state with second- or higher-stage operation of the PTC heater 30, the process proceeds through step S6→step S7→step S8 and then proceeds to the end in the flowchart of FIG. 2. In step S8, the LU differential pressure learning value is updated to a higher value by an increment of "α"; and the "coasting capacity learning control completion FLG" is set to 0.

In the case where the PTC heater is being operated at the second or higher stage after the shift from the coasting open-control state to the coasting capacity learning state, the process proceeds through step S2→step S9→step S3 in the flowchart of FIG. 2. The coasting capacity learning control is then stopped.

It is now assumed that the PTC heater 30 is not operated or is operated at the first stage after the shift from the coasting open-control state to the coasting capacity learning state.

In the case where completion of the coasting capacity learning has not been experienced, the process proceeds through step S2→step S9→step S10→step S11 in the flowchart of FIG. 3. The sequence of steps S9→S10→S11 is repeated until the completion of the coasting capacity learning.

In the case where the coasting capacity learning control is completed by detection of a slip of the lock-up clutch, the process proceeds through step S11→step S12→step S13 in the flowchart of FIG. 3 and then proceeds back from step S13 to step S3. In step S13, the value of the ENG torque at the completion of the learning control is updated as the "ENG torque learning value balanced with the coasting torque"; and the LU differential pressure command value at the completion of the learning control is updated as the "LU differential pressure learning value balanced with the coasting torque". Further, the "coasting capacity learning control completion FLG" is set to 1.

In the case where the coasting capacity learning control is completed by any reason other than slip detection without experience of completion of the coasting capacity learning state, the process proceeds through S11→step 12→step S14 in the flowchart of FIG. 3. In step S14, it is judged whether the condition of LU differential command pressure≤current LU differential pressure learning value is satisfied or not at the completion of the coasting capacity learning. When LU differential command pressure≤LU differential pressure learning value, the process proceeds to step S15. In step S15, it is judged whether the condition of |ENG torque signal value|≥current ENG torque learning value is satisfied or not at the completion of the coasting capacity learning. When |ENG torque signal value|≥ENG torque learning value, the process proceeds to step S16. In step S16, the LU differential pressure command value at the completion of the learning control is updated as the "LU differential pressure learning value for learning promotion"; and the value of the ENG torque signal at the completion of the learning control is updated as the "ENG torque learning value for learning promotion". After that, the process proceeds back to step S3.

It is again assumed that the PTC heater 30 is not operated or is operated at the first stage after the shift from the coasting open-control state to the coasting capacity learning state.

In the case where completion of the coasting capacity learning has been experienced, the process proceeds through step S2→step S9→step S10→step S17 in the flowchart of FIGS. 3 and 4. The sequence of steps S9→S10→S17 is repeated until the completion of the coasting capacity learning.

In the case where the coasting capacity learning control is completed by detection of a slip of the lock-up clutch, the process proceeds through step S17→, step S18→step S19 in the flowchart of FIG. 4 and then proceeds back from step S19 to step S3. In step S19, the value of the ENG torque at the completion of the learning control is updated as the "ENG torque learning value balanced with the coasting torque"; and the LU differential pressure command value at the completion of the learning control is updated as the "LU differential pressure learning value balanced with the coasting torque".

In the case where the coasting capacity learning control is completed by any reason other than slip detection under the situation that completion of the coasting capacity learning has been experienced, the process proceeds from step S18 back to step S3 in the flowchart of FIG. 4. In this case, the learning value under the coasting capacity learning control is not updated.

Comparative Example and its Problems

The purpose of the coasting capacity learning control is to minimize the LU differential pressure during vehicle coasting (such as fuel-cut state) for improvement in LU release response.

The initial learning value (unlearned value) of the coasting LU differential pressure at the time of factory shipping is high. When the learning control is performed during user's usual driving, the learning value of the coasting LU differential pressure is decreased to a low capacity level balanced with an engine coasting torque (negative torque).

By updating the learning value of the coasting LU differential pressure from its initial learning value to the low LU differential pressure value under the coasting capacity learning control, the following effects are obtained:
  (a) prevention of engine stall (at rapid deceleration);
  (b) relaxing of LU release shock (at gentle deceleration);
  (c) relaxing of tip-in shock (at reacceleration from coasting); and the like.

It is herein assumed that, in Comparative Example, coasting capacity learning control is performed to search for a slip point (i.e. the coasting LU capacity balanced with the coasting engine torque) by setting only a rotation speed-dependent reference offset value as the LU differential pressure offset to be added to the learning value. The coasting capacity learning control of Comparative Example will be explained in more detail below with reference to FIG. 8.

In the coasting capacity learning control of Comparative Example, the LU control state shifts as follows: a LU full engagement state before time t1; a delay state between time t1 and time t2; a coasting open-control state between time t2 and time t4; a coasting capacity learning state between time t4 and time t6; and a post-learning constant differential pressure state (slight lockup state) after time t6. In the delay state, the LU differential pressure command value is maintained until time 2 on the basis of accelerator release operation. In the coasting open-control state between time t2 and time t4, the LU differential pressure command value is decreased with a steep gradient by open control to a value which is obtained by adding the LU differential pressure reference offset value to the previously obtained LU differential pressure learning value. When the LU hydraulic pressure reaches its target value under the coasting open-control state, the LU differential pressure command value is gradually decreased with a gentle gradient in the coasting capacity learning state between time t4 and time t6. The coasting capacity learning control is completed upon detection of a slip of the lock-up clutch (i.e. rotational difference between the transmission input rotation speed InpREV and the engine rotation speed EngREV) during the decrease of the LU differential pressure command value. Then, the ENG torque value at control completion time t6 is updated as the ENG torque learning value balanced with the coasting torque. The LU differential pressure command value at completion time is also updated as the LU differential pressure learning value balanced with the coasting torque. In the post-learning constant differential pressure state after time t6, the LU differential pressure command value is increased to a value which is obtained by adding the LU differential pressure reference offset value to the currently obtained LU differential pressure learning value. The lock-up clutch is accordingly placed in a slight lockup state where a slip of the lock-up clutch is suppressed.

Figure 8:
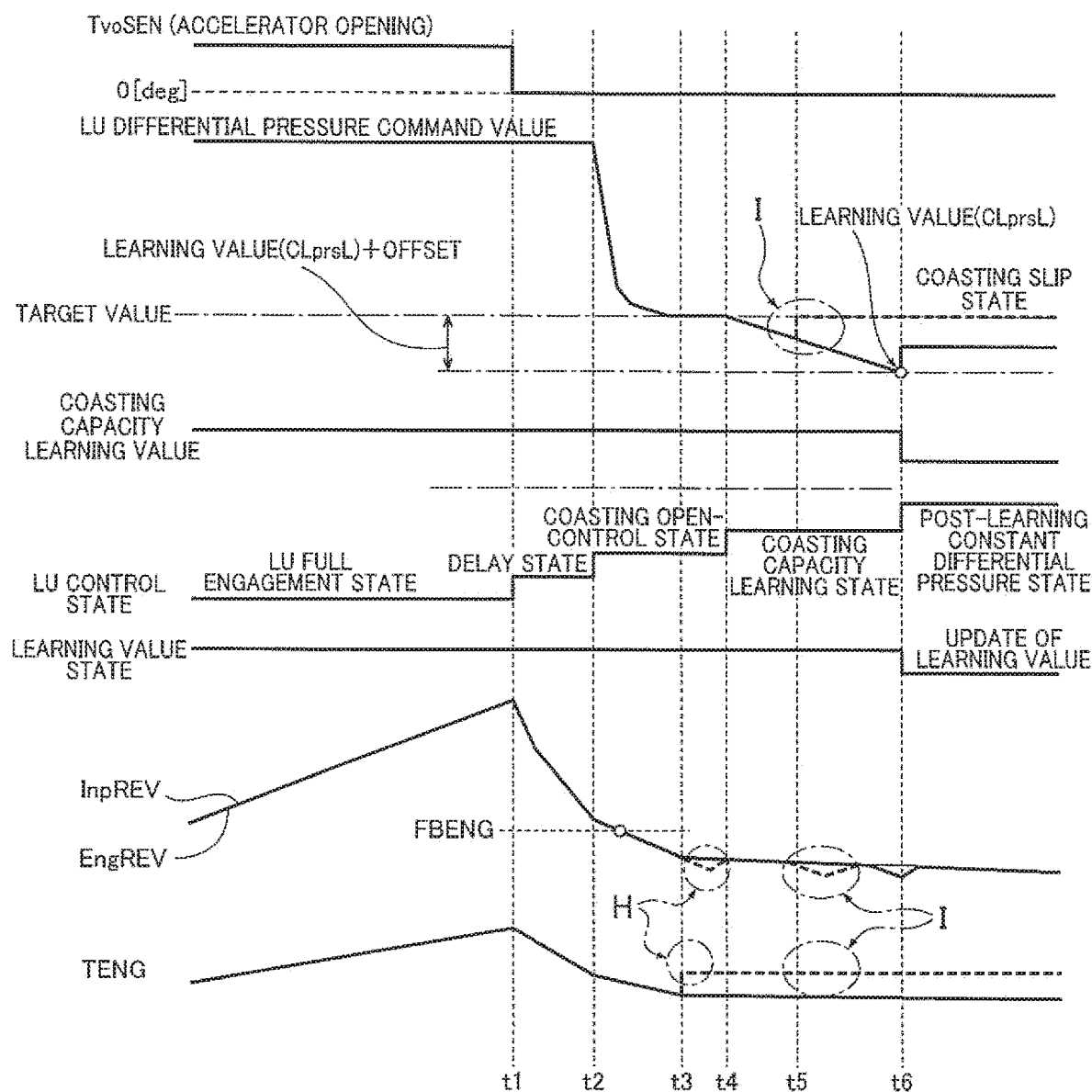
FIG. 8 is a time chart showing operation characteristics in the case where operation of a PTC heater temporarily intervenes under a coasting open-control state or coasting capacity learning state in a coasting capacity learning control process of Comparative Example.

When there takes place an intervention of engine auxiliary equipment load at time t3 during the coasting open-control state in Comparative Example, an unintentional LU slip occurs with increase in ENG torque TENG as indicated by arrows H in FIG. 8. When there takes place an intervention of engine auxiliary equipment load at time t5 during the coasting capacity learning state in Comparative Example, an unintentional LU slip also occurs with increase in ENG torque TENG as indicated by arrows I in FIG. 8. In Comparative Example, the learning value is largely varied every time an intervention of engine auxiliary equipment load takes place during the execution of the coasting capacity learning control. This results in erroneous learning. It is conceivable to prohibit update of the learning value at the time when there takes place an intervention of engine auxiliary equipment load during the execution of the coasting capacity learning control. This however results in loss of learning opportunities so that the coasting LU differential pressure can never be decreased to an adequate differential pressure level.

[Concepts of LU Differential Pressure Correction Value and Coasting Capacity Learning]

The concept of the LU differential pressure correction value will be now explained below. In the coasting capacity learning control process of Embodiment 1, the sum of the "LU differential pressure reference offset value" and the "LU differential pressure correction value" corresponding to a variation of ENG torque load is utilized as the LU differential pressure offset to be added to the "LU differential pressure learning value" for determination of the LU differential pressure command value.

Figure 9:
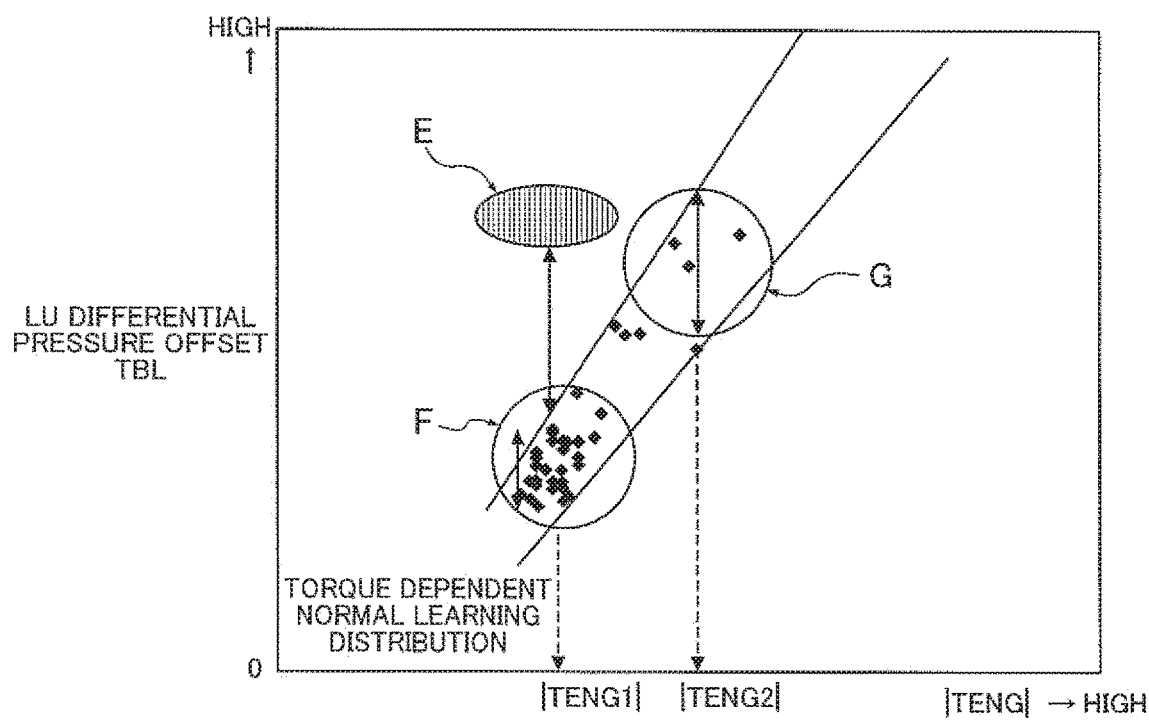
FIG. 9 is an experimental data diagram showing a torque-dependent normal learning distribution to derive the concept of a differential pressure offset value to be added to the lock-up differential pressure learning value for the determination of the lock-up differential pressure command value in the coasting capacity learning control process of Embodiment 1.

The experimentally obtained torque-dependent normal learning distribution is shown in FIG. 9. In the case that the LU differential pressure offset TBL to be added to the "LU differential pressure learning value" is set to within a high value region indicated by an arrow E in FIG. 9 under the condition that the Eng torque absolute value |TENG| is in a normal coasting torque range |TENG|, it takes time until the completion of the learning. On the other hand, an instantaneous slip of the lock-up clutch is prevented even when the LU differential pressure offset TBL is set to within a low value region indicated by an arrow F in FIG. 9, which is lower than the region indicated by the arrow E, in the normal coasting torque range |TENG1|. Further, an instantaneous slip of the lock-up clutch is prevented when the LU differential pressure offset TBL is set to within a high value region indicated by an arrow G in FIG. 9, which is equivalent to the region indicated by the arrow E, under the condition that the Eng torque absolute value |TENG| is in a high torque range |TENG2|.

Figure 10:
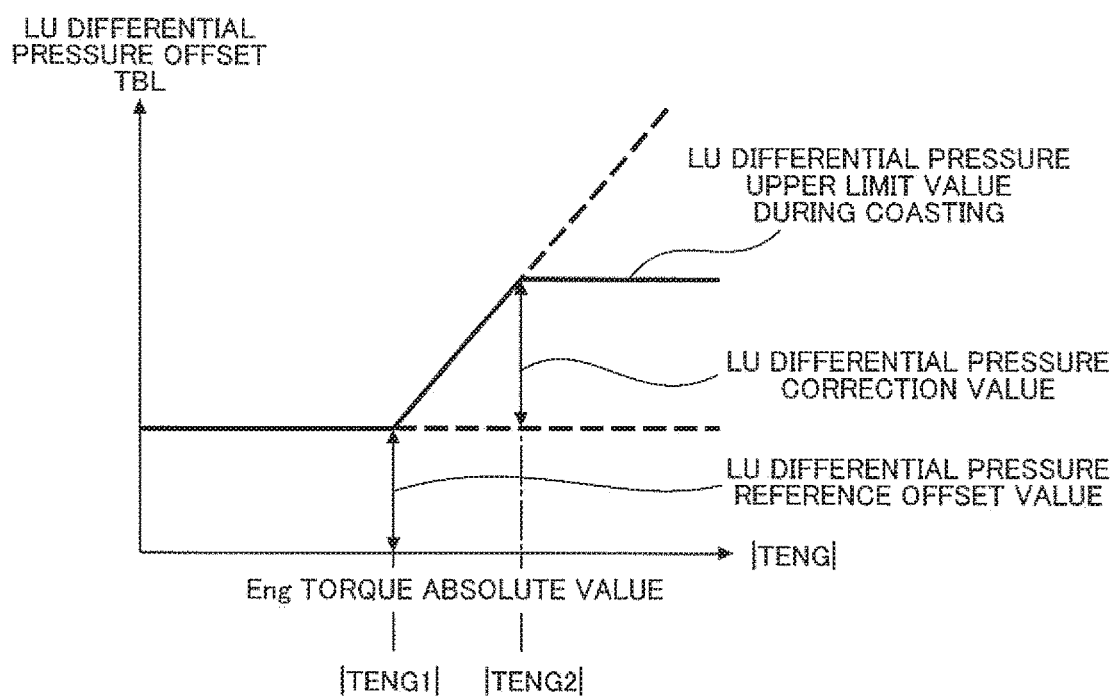
FIG. 10 is a differential pressure offset characteristic diagram explaining the concept of a differential pressure offset to be added to the lock-up differential pressure learning value for the determination of the lock-up differential pressure command value in the coasting capacity learning control process of Embodiment 1.

When the characteristics of the LU differential pressure offset to be added to the "LU differential pressure learning value" as shown in FIG. 9 is expressed using constants, there is obtained the correlation characteristics of the LU differential pressure offset and the Eng torque absolute value as shown in FIG. 10. The LU differential pressure reference offset value that corresponds to a rotation speed-dependent offset capable of absorbing variation errors is utilized until the engine torque absolute value |TENG| reaches the normal coasting torque range |TENG|. The sum of the LU differential pressure reference offset value and the LU differential pressure correction value that corresponds to a torque-dependent offset that increases with increase in the engine torque absolute value |TENG| is utilized when the engine torque absolute value |TENG| exceeds the normal coasting torque range |TENG|. In view of the upper limit of variation relative to the LU differential pressure reference offset value as well as the engine stall performance, a coasting LU differential pressure upper limit is set on the LU differential pressure correction value when the engine torque absolute value |TENG| is higher than or equal to the high torque range |TENG2|.

Next, the concept of the coasting capacity learning where the sum of the "LU differential pressure reference offset value" and the "LU differential pressure correction value" corresponding to a variation of ENG toque load is utilized as the LU differential pressure offset will be explained below.

Figure 11:
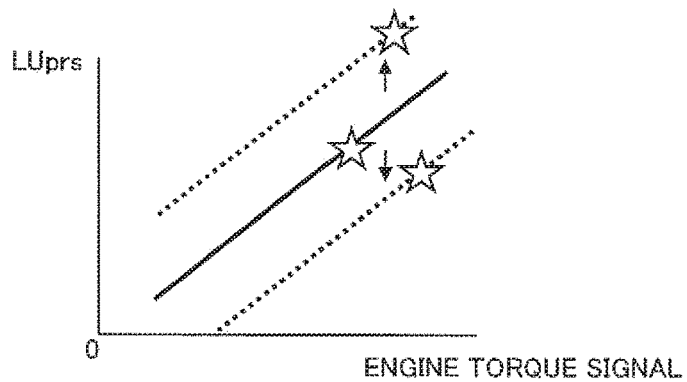
FIG. 11 is a schematic view showing correction of learning characteristics, for balancing of the lock-up differential pressure with the engine torque due to individual part variations, upon detection of a slip of the lock-up clutch under the coasting capacity learning state where completion of learning has not been experienced.

As shown by the sequence of step S12→step S13 in FIG. 3 and the sequence of step S18→step S19 in FIG. 4, the update of the ENG torque learning value and the LU differential pressure learning value is performed in the case where the coasting capacity learning is completed by detection of a slip of the lock-up clutch. As shown in FIG. 11, the ENG torque learning value and the LU differential pressure learning value are updated in the correlation characteristics of the ENG torque learning value and the LU differential pressure learning value irrespective of whether or not there takes place an operation intervention of the PTC heater 30.

Figure 12:
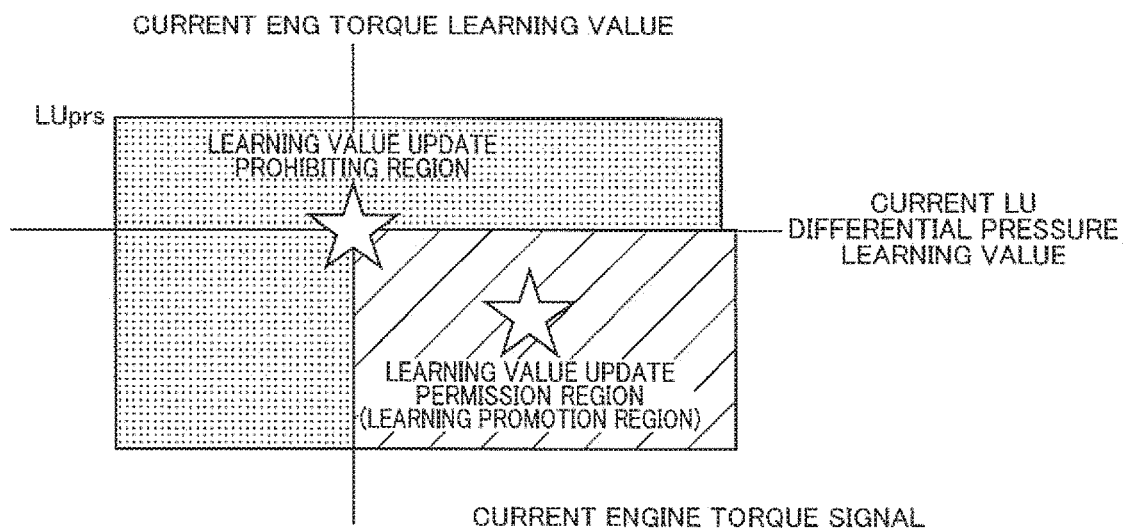
FIG. 12 is a schematic view showing a learning value update permission region in the case where the coasting capacity learning control is completed, without a slip of the lock-up clutch, by learning prohibition of the lock-up differential pressure command value during coasting under the coasting capacity learning state where completion of learning has not been experienced.
Figure 13:
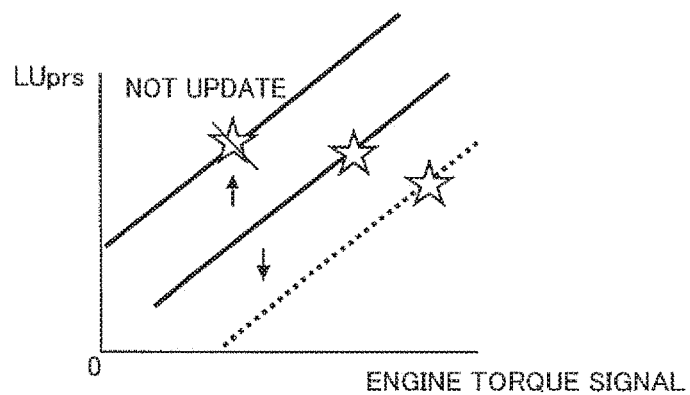
FIG. 13 is a learning value characteristic diagram showing learning acts in the case where the coasting capacity learning control is completed, without a slip of the lock-up clutch, by learning prohibition of the lock-up differential pressure command value during coasting under the coasting capacity learning state where completion of learning has not been experienced.

In the case where the coasting capacity learning is completed without slip detection under the situation that completion of the coasting capacity learning has been experienced, by contrast, the update of the learning value on the condition of slip detection is not performed as shown by the sequence of step S18→step S3 in FIG. 4. As shown by the sequence of step S12→step S14→, step S15→step S16 in FIG. 2, however, the LU differential pressure learning value is exceptionally updated in the case where the coasting capacity learning is completed without slip detection under the situation that completion of the coasting capacity learning has not been experienced. In other words, the update of the learning value is permitted in a learning promotion region where the conditions of "LU differential pressure command value"≤"LU differential pressure learning value" and "|ENG toque signal value|≥ENG torque learning value" are satisfied as shown in FIG. 12. As shown in FIG. 13, the LU differential pressure learning value is updated in the correlation characteristics of the ENG torque learning value and the LU differential pressure learning value only in the case where the coasting capacity learning is completed without slip detection under the situation that completion of the coasting capacity learning has not been experienced. Herein, the wording "promotion" means lowering of the correlation characteristic of the learning value as shown in FIG. 13.

As shown by the sequence of step S6→step S7→step S8 in FIG. 2, the LU differential pressure learning value is updated to a higher value by an increment of "α" in the case where LU release occurs in the coasting capacity learning state irrespective of whether or not the completion of the coasting capacity learning has been experienced. In view of the fact that this update is performed upon the occurrence of LU release as an abnormal slip event, the experience of completion of the coasting capacity learning is reset to none in the case where the completion of the coasting capacity learning has been experienced. The update of the LU differential pressure learning value by an increment of "α" is intended to, in view of the possibility of deviations of the ENG torque learning value and the LU differential pressure learning value, correct the deviation of the learning value in a direction that prevents a slip of the lock-up clutch as already mentioned before. In the case where there is a large load variation during the second- or higher-stage operation of the PCT heater, however, the "LU differential pressure learning value" is not corrected because the correction of the "LU differential pressure learning value" by an increment of "a" may result in a large deviation of the corrected learning value from the true learning value.

[Coasting Capacity Learning Control Operations]

The operations of the coasting capacity learning control process of Embodiment 1 will be explained below with reference to the time charts of FIGS. 14 to 16.

Figure 14:
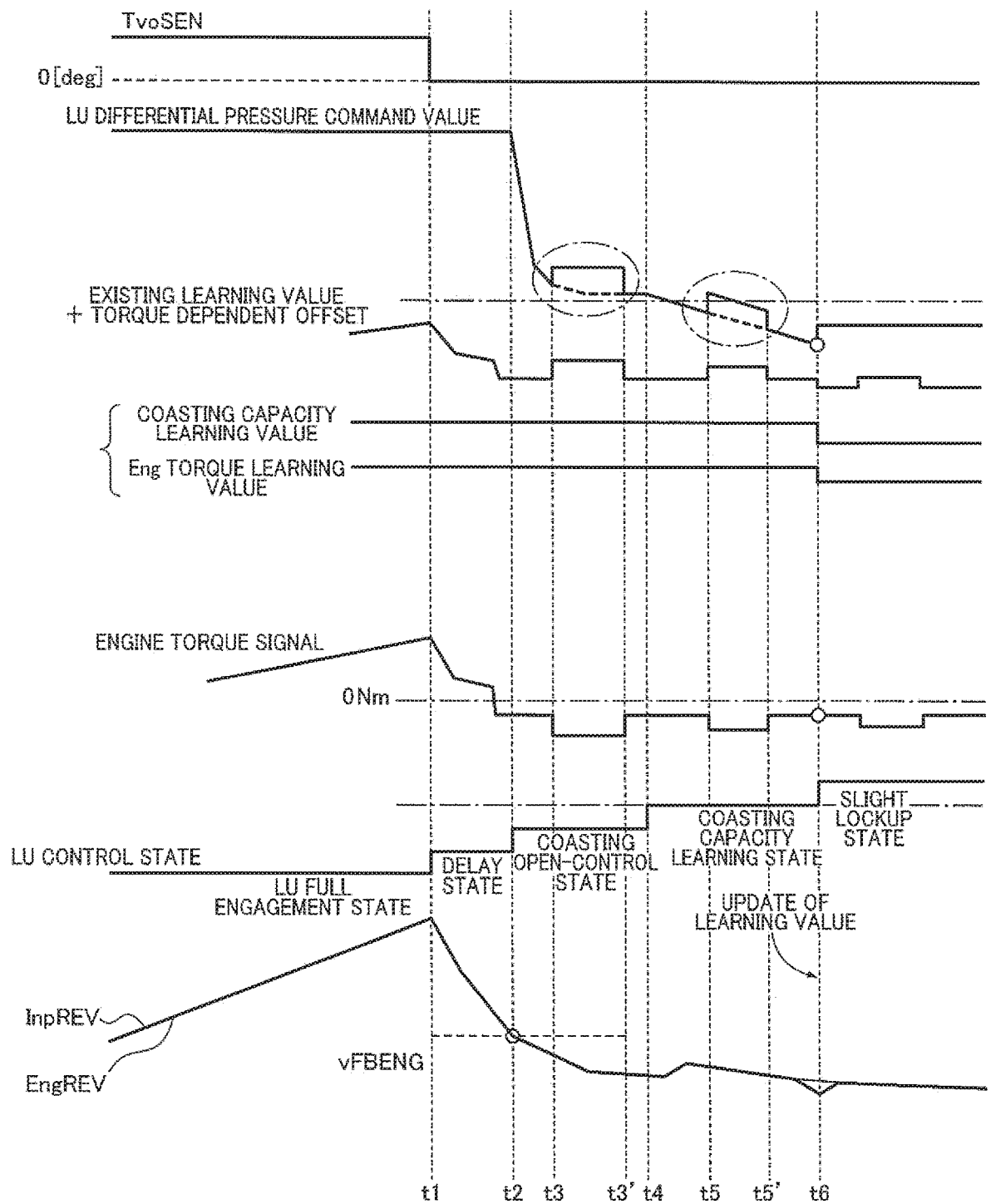
FIG. 14 is a time chart showing operation characteristics in the case where operation of the PTC heater temporarily intervenes under the coasting open-control state and the coasting capacity learning state in the coasting capacity learning control process of Embodiment 1.

FIG. 14 is a time chart showing coasting capacity learning control operations in the case where operation of the PTC heater 30 temporarily intervenes under the coasting open-control state and the coasting capacity learning state in the coasting capacity learning control process of Embodiment 1.

When first-stage operation of the PTC heater 30 takes place between time t3 and time t3' in the coasting open-control state, the absolute value of the engine torque signal increases. The LU differential pressure correction value (=torque-dependent offset value) increases with such increase in engine torque signal absolute value. Further, the absolute value of the engine torque signal increases when first-stage operation of the PTC heater takes place between time t5 and time t5' in the coasting capacity learning state. The LU differential pressure correction value (=torque-dependent offset value) also increases with such increase in engine torque signal absolute value.

Under such control, a slip of the lock-up clutch 3 (i.e. rotational difference between the transmission input rotation speed InpREV and the engine rotation speed EngREV) does not occur during the period from time t3 to time t3' in the coasting open-control state and during the period from time t5 to time t5' in the coasting capacity learning state as is different from Comparative Example. Upon the shift to time t6, a slip of the lock-up clutch 3 occurs. The coasting capacity learning is then completed. In this way, the learning value is normally updated irrespective of the intervention of first-stage operation of the PCT heater 30.

Figure 15:
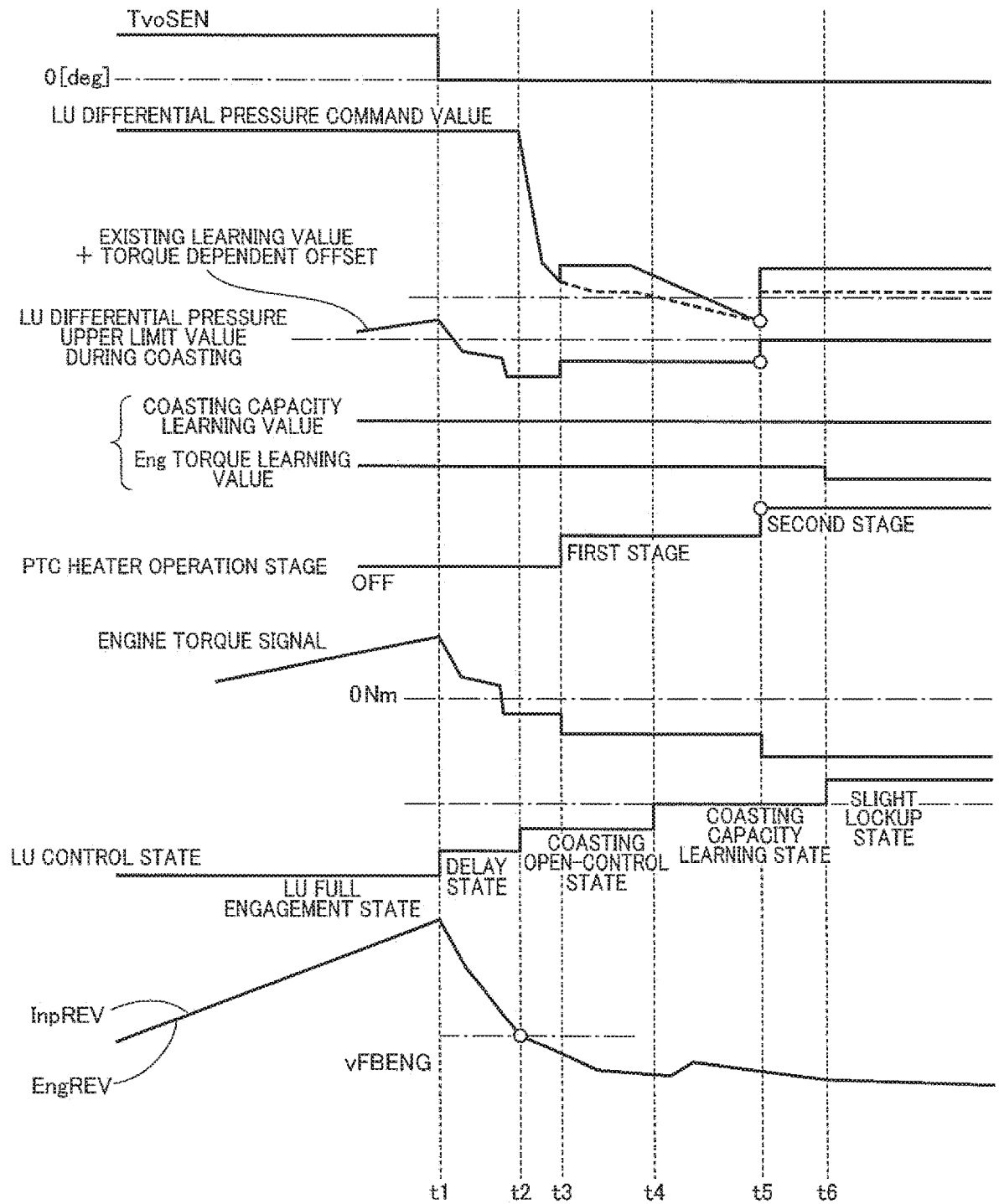
FIG. 15 is a time chart showing operation characteristics in the case where, after first-stage operation of the PTC heater intervenes during the coasting open-control state, the PTC heater shifts to the second stage during the coasting capacity learning state in the coasting capacity learning control process according to Embodiment 1.

FIG. 15 is a time chart showing coasting capacity learning control operations in the case where, after first-stage operation of the PTC heater 30 intervenes during the coasting open-control state, the operation stage of the PCT heater 30 shifts to the second stage during the coasting capacity learning state in the coasting capacity learning control process of Embodiment 1.

After first-stage operation of the PTC heater 30 takes place at time t3 during the coasting open-control state, the operation stage of the PCT heater 30 shifts to the second stage at time t5 during the coasting capacity learning state. In this case, the process proceeds back from step S9 to step S3 in the flowchart of FIG. 3. Consequently, the update of the learning value under the coasting capacity learning control is stopped at time t5. The LU differential pressure command value is increased so as to prevent a slip of the lock-up clutch 3 under load caused by the second-stage operation of the PTC heater 30.

Figure 16:
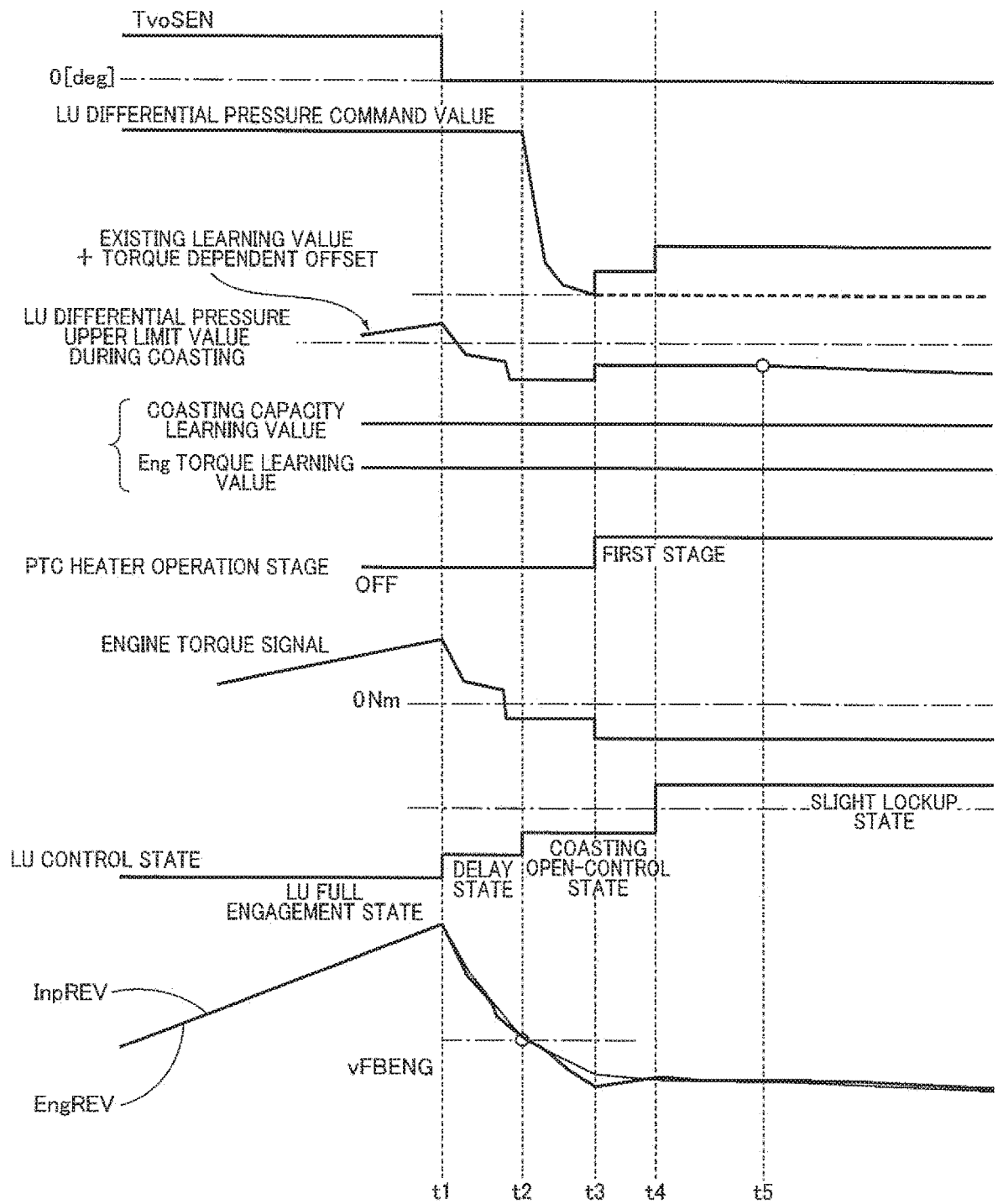
FIG. 16 is a time chart showing operation characteristics in the case where LU release occurs at the time when first-stage operation of the PCT heater intervenes during the coasting open-control state in the coasting capacity learning control process of Embodiment 1.

FIG. 16 is a time chart showing coasting capacity learning control operations in the case where LU release occurs at the time when first-stage operation of the PTC heater 30 intervenes during the coasting open-control state in the coasting capacity learning control process of Embodiment 1.

Upon the occurrence of LU release (i.e. rotation difference between the transmission input rotation speed InpREV and the engine rotation speed EngREV) at the time with the intervention of first-stage operation of the PTC heater 30 at time t3 during the coasting open-control state, the coasting capacity learning under the control of the LU differential pressure command value is stopped. In this case, the LU differential pressure learning value is updated to a higher value by an increment of "a". After the shift to time t4, the LU differential pressure command value is increased due to the incremental update of the LU differential pressure learning value as shown in FIG. 16.

[Features of Coasting Capacity Learning Control Process]

In Embodiment 1, the LU differential pressure command value is corrected by adding thereto the LU differential pressure correction value that corresponds to an increase of input torque to the lock-up clutch 3 when the operation of the PTC heater 30 intervenes during the execution of the coast capacity learning control.

Even when the input torque to the lock-up clutch 3 is increased with the operation intervention of the PTC heater 30 under the coasting capacity learning control, the LU differential pressure command value is corrected by adding thereto the LU differential pressure correction value corresponding to such input torque increase whereby the engaging capacity of the lock-up clutch 3 is increased. A slip of the lock-up clutch 3 is hence suppressed from occurring due to the operation intervention of the PTC heater 30 during the coast capacity learning control. Even when the operation of the PTC heater 30 intervenes under the coast capacity learning control, a slip of the lock-up clutch 3 occurs at the timing where the LU differential pressure becomes balanced with the coasting torque. The LU differential pressure learning value can be thus obtained without erroneous learning. Furthermore, the input torque variation is not the condition for completing the coasting capacity learning control. The opportunities to experience the coasting capacity learning can be thus ensured even when the input torque varies with the operation intervention of the PTC heater 30 under the coast capacity learning control.

It is accordingly possible to, even when there takes place an operation intervention of the PTC heater 30 under the coast capacity learning control, prevent erroneous learning due to a slip of the lock-up clutch 3 and preventing loss of learning opportunities.

When the LU differential pressure learning value is updated upon detection of the slip of the lock-up clutch, the engine torque value at the detection of the slip of the lock-up clutch 3 is also updated and stored as the ENG torque learning value balanced with the coasting torque in Embodiment 1. The LU differential pressure correction value is determined based on a difference between the current ENG torque value and the ENG torque learning value.

More specifically, the LU differential pressure correction value is determined based on a difference between the current ENG torque value that varies depending on the operation status of the PTC heater 30 and the ENG torque learning value that remains constant irrespective of the operation of the PTC heater 30. It is thus possible to, even when the operation of the PTC heater 30 takes place so that the input torque to the lock-up clutch 3 varies depending on the operation status of the PTC heater 30, control the engaging capacity of the lock-up clutch 3 by following the input torque variation.

By setting the appropriate LU differential pressure correction value according to the input torque variation as explained above, two problems of clutch slip due to insufficient clutch capacity and delay in learning control completion timing due to excessive clutch capacity can be avoided.

In Embodiment 1, the LU differential pressure command value for the lock-up clutch 3 is decreased to the value obtained by adding the LU differential pressure reference offset value to the LU differential pressure learning value in the coasting open-control state during the accelerator release operation. After that, the LU differential pressure command value is gradually decreased in the coasting capacity learning state. In the coasting open-control state and the coasting capacity learning state, the LU differential pressure command value is determined by adding the LU differential pressure reference offset value and the LU differential pressure correction value to the LU differential pressure learning value.

In the current coasting capacity learning control, the LU differential pressure command value for the lock-up clutch 3 is determined by adding a LU differential pressure reference offset value to a LU differential pressure learning value. This LU differential pressure reference offset value is regarded as a rotation speed-dependent offset value corresponding to the ENG friction.

In contrast to the LU differential pressure reference offset value as the rotation speed-dependent offset value, the LU differential pressure correction value to be added for the determination and correction of the LU differential pressure command value is regarded as a torque-dependent offset value dependent on the ENG torque. Although both of the LU differential pressure reference offset value and the LU differential pressure correction value are offset values, these offset values can be regarded as different factors respectively corresponding to the ENG friction and the ENG torque variation such as auxiliary equipment load and thus handled independently of each other.

It is consequently possible to obtain the LU differential pressure command value for the lock-up clutch 3 in correspondence with the operation intervention of the PTC heater 30 by simple addition means of, while maintaining the existing LU differential pressure reference offset value as it is, adding the LU differential pressure correction value to the LU differential pressure reference offset value.

In Embodiment 1, the update of the learning value is stopped when the second- or higher-stage operation of the PTC heater 30 takes place exceeding an upper limit load in the coasting capacity learning state.

The error of the ENG torque load becomes large when the load on the lock-up clutch 3 exceeds its upper limit value during the second- or higher-stage operation of the PTC heater 30. In the case where the learning value is updated under the situation that the error of the ENG torque load becomes large, there may arises a deviation of the learning value from the true value by the influence of such an error on the learning value.

It is however possible to prevent the deviation of the learning value from the true value by stopping the update of the learning value when the second- or higher-stage operation of the PTC heater 30 takes place exceeding the upper limit load.

When the coasting capacity learning control is completed without slip detection in the coasting capacity learning state where completion of the learning has not been experienced, the LU differential pressure learning value and the ENG torque learning value are updated on the conditions that: the LU differential pressure learning value is lower than or equal to its current learning value; and the ENG torque learning value is higher than or equal to its current learning value in Embodiment 1.

In other words, the learning values are in principle not updated when the coasting capacity learning control is completed without slip detection in the coasting capacity learning state. The LU differential pressure initial learning value and the ENG torque initial learning value, both of which have not experienced update, are however set high for design by estimating maximum variation amounts for the values balanced with the coasting torque. When the coasting capacity learning control is completed without slip detection in the coasting capacity learning state where completion of the learning has not been experienced, the update of the LU differential pressure learning value and the ENG torque learning value is permitted on the conditions that: the LU differential pressure learning value is updated to be lower than or equal to its current learning value; and the ENG torque learning value is updated to be higher than or equal to its current learning value as explained above.

It is thus possible to, even when the coasting capacity learning control is completed without slip detection under the situation that completion of the learning has not been experienced, advance completion of the learning during the next learning control by setting the learning promotion region in which the update of the learning values is exceptionally permitted.

Furthermore, the LU differential pressure learning value is updated to a higher value when the lock-up clutch 3 is slipped and released with the first-stage operation of the PTC heater 30 during the coasting open-control state in Embodiment 1.

The LU release caused by the first-stage operation of the PTC heater 30 in the coasting open-control state before shifting to the coasting capacity learning state can be regarded as an abnormal slip of the lock-up clutch 3 due to insufficient engaging capacity.

It is thus possible to prevent the occurrence of LU release during the next coasting capacity learning control by updating the LU differential pressure learning value to a higher value when LU release occurs in the coasting open-control state.

The effects of the lock-up clutch control device will be explained below.

The lock-up clutch control device of the PTC heater-equipped engine vehicle according to Embodiment 1 provides the following effects.

(1) The control device of the vehicle in which the torque converter 4 with the lockup clutch 3 is disposed between the engine 1 and the continuously variable transmission 6 (as a transmission) executes control processing of decreasing a command value (LU differential pressure command value) for decreasing a lock-up engaging force of the lockup clutch 3 during accelerator release operation. The control device has a coasting capacity learning control section (FIGS. 2 to 4: CVT control unit 12) configured to, when a slip of the lock-up clutch is detected during the decrease of the command value (LU differential pressure command value), update the command value (LU differential pressure command value) at the time of detection of the slip as a lock-up learning value (LU differential pressure learning value) balanced with a coasting torque. The coasting capacity learning control section (FIGS. 2 to 4: CVT control unit 12) is further configured to, when an intervention of engine auxiliary equipment load (such as operation of the PTC heater 30) takes place under the coasting capacity learning control, correct the command value (LU differential pressure command value) by adding thereto a lock-up pressure correction value (LU differential pressure correction value) that corresponds to an increase of input torque to the lock-up clutch 3.

It is possible in this configuration to, even when there takes place an intervention of engine auxiliary equipment load (such as operation of the PTC heater 30) under coasting capacity learning control, not only prevent erroneous learning due to a slip of the lock-up clutch 3 but also prevent loss of learning opportunities.

(2) The coasting capacity learning control section (FIGS. 2 to 4: CVT control unit 12) is configured to update and store an engine torque value at the time of detection of the slip of the lock-up clutch 3 as an engine torque learning value (ENG torque learning value) balanced with the coasting torque concurrently when the lock-up learning value (LU differential pressure learning value) is updated at the time of detection of the slip; and the command value (LU differential pressure command value) is determined based on a difference between the current engine torque value (ENG torque value) and the engine torque learning value (ENG torque learning value).

It is possible in this configuration to, in addition to the above effect (1), set the appropriate command value according to the input torque variation and thereby prevent two problems: clutch slip due to insufficient clutch capacity and delay in learning control completion timing due to excessive clutch capacity.

(3) The coasting capacity learning control section (FIGS. 2 to 4: CVT control unit 12) is configured to, during the accelerator release operation, perform open control to decrease the command value (LU differential pressure command value) to a value obtained by adding a lock-up pressure reference offset value (LU differential pressure reference offset value) to the lock-up learning value (LU differential pressure learning value) in the coasting open-control state and then perform coasting capacity learning control to gradually decrease the command value (LU differential pressure command value) in a coasting capacity learning state. In the coasting open-control state and the coasting capacity learning state, the command value (LU differential pressure command value) is determined by adding the lock-up pressure reference offset value (LU differential pressure reference offset value) and the lock-up pressure correction value (LU differential pressure correction value) to the lock-up learning value (LU differential pressure learning value).

It is possible in this configuration to, in addition to the above effects (1) and (2), obtain the command value (LU differential pressure command value) for the lock-up clutch 3 in correspondence with the intervention of engine auxiliary equipment load (such as operation of the PTC heater 30) by simple addition means with the existing lock-up pressure reference offset value (LU differential pressure reference offset value) maintained as it is.

(4) The coasting capacity learning control section (FIGS. 2 to 4: CVT control unit 12) is configured to stop the update of the learning value when an intervention of engine auxiliary equipment load exceeding an upper limit load takes place during the coasting capacity learning state (e.g. the PTC heater 30 is operated at the second or higher stage).

It is possible in this configuration to, in addition to the above effect (3), prevent a deviation of the learning value from the true value under the coasting capacity learning control.

(5) The coasting capacity learning control section (FIGS. 2 to 4: CVT control unit 12) is configured to, when the coasting capacity learning control is completed without detection of a slip of the lock-up clutch in the coasting capacity learning state where learning completion has not been experienced, permit the update of the lock-up learning value (LU differential pressure learning value) and the engine torque learning value (ENG torque learning value) on the conditions that: the lock-up learning value (LU differential pressure learning value) is lower than or equal to a currently stored lock-up learning value; and the engine torque learning value (ENG torque learning value) is higher than or equal to a currently stored engine torque learning value.

In addition to the above effects (3) and (4), it is possible in this configuration to, even when the coasting capacity learning control is completed without slip detection under the situation that learning completion has not been experienced, advance learning completion during the next learning control by setting the learning promotion region in which the update of the learning values is exceptionally permitted.

(6) The coasting capacity learning control section (FIGS. 2 to 4: CVT control unit 12) is configured to, when the lock-up clutch 3 is slipped and thereby released from engagement by an intervention of engine auxiliary equipment load (such as first-stage operation of the PTC heater 30) during the coasting open-control state, update the lock-up learning value (LU differential pressure learning value) to a higher value.

In addition to the above effects (3) to (5), it is possible in this configuration to, when LU release occurs in the coasting open-control state, update the lock-up learning (LU differential pressure learning value) to a higher value and thereby prevent the occurrence of LU release during the next coasting capacity learning control.

Although the lock-up clutch control device of the vehicle according to the present invention has been described above with reference to Embodiment 1, the present invention is not specifically limited to Embodiment 1. Various design changes and modifications can be made to this embodiment without departing from the scope of the present invention.

In Embodiment 1, the PTC heater 30 mounted as the heating device on the vehicle is explained as one example of engine auxiliary equipment load. The engine auxiliary equipment load may alternatively be load-increasing operation of any other engine auxiliary equipment device such as compressor or alternator. Further, simultaneous operation of a plurality of engine auxiliary equipment devices may be regarded as total engine auxiliary equipment load.

In conjunction with the update of the LU differential pressure leaning value at the time of detection of the slip of the lock-up clutch 3, the engine torque value at the time of detection of the slip is updated and stored as the ENG torque learning value balanced with the coasting torque; and then, the LU differential pressure correction value is determined based on the difference between the current actual ENG torque value and the ENG torque learning value in Embodiment 1. It is alternatively feasible to prepare a correction value map as shown in FIG. 10 in advance and retrieve the LU differential pressure correction value from the map in accordance with variation in ENG torque absolute value.

In Embodiment 1, the LU differential pressure command value is determined by adding the LU differential pressure reference offset value and the LU differential pressure correction value to the LU differential pressure learning value. It is alternatively feasible to correct the LU differential pressure reference offset value without separating the LU differential pressure reference offset value and the LU differential pressure correction value as different factors, or feasible to correct the LU differential pressure command value itself.

In Embodiment 1, the lock-up clutch control device according to the present invention is applied to the PCT heater-equipped engine vehicle in which the continuously variable transmission is mounted as a transmission. The lock-up clutch control device according to the present invention is applicable to even a hybrid vehicle as long as the vehicle is equipped with the engine as a driving source. Furthermore, the transmission is not limited to the continuously variable transmission and can alternatively be a stepped transmission. Namely, the lock-up clutch control device according to the present invention is applicable to any vehicle in which the torque converter with the lock-up clutch is disposed between the engine and the transmission.

The invention claimed is:

1. A lock-up clutch control device of a vehicle, the vehicle comprising an engine, a transmission and a torque converter provided with a lock-up clutch between the engine and the transmission,
the lock-up clutch control device comprising a coasting capacity learning control section configured to: execute control processing of generating a command value for decreasing a lock-up engaging force of the lock-up clutch during accelerator release operation; and, when a slip of the lock-up clutch is detected during the decrease of the command value, update the command value at the time of detection of the slip as a lock-up learning value balanced with a coasting torque and update an engine torque value at the time of detection of the slip as an engine torque learning value balanced with coasting torque,
wherein the coasting capacity learning control section is configured to:
during the accelerator release operation, decrease the command value to a value obtained by adding a lock-up pressure reference offset value to the lock-up learning value in a coasting open-control state, and then, perform coasting capacity learning control to gradually decrease the command value;
when an intervention of engine auxiliary equipment load takes place under the coasting capacity learning control, correct the command value by adding thereto a lock-up pressure correction value that corresponds to an increase of input torque to the lock-up clutch; and
when the coasting capacity learning control is completed without detection of a slip of the lock-up clutch during the coasting capacity learning control where learning completion has not been experienced, permit the update of the lock-up learning value and the engine torque learning value on the conditions that: the lock-up learning value is lower than or equal to a current lock-up learning value; and the engine torque learning value is higher than or equal to a current engine torque learning value.

2. The lock-up clutch control device of the vehicle according to claim 1, wherein the lock-up pressure correction value is determined based on a difference between a current engine toque value and the engine torque learning value.

3. The lock-up clutch control device of the vehicle according to claim 1, wherein, in the coasting open-control state and during the coasting capacity learning control, the command value is determined by adding the lock-up pressure reference offset value and the lock-up pressure correction value to the lock-up learning value.

4. The lock-up clutch control device of the vehicle according to claim 3, wherein the coasting capacity learning control section is configured to stop the update of the lock-up learning value when the intervention of engine auxiliary equipment load exceeding an upper limit load takes place during the coasting capacity learning control.

5. The lock-up clutch control device of the vehicle according to claim 3, wherein the coasting capacity learning control section is configured to update the lock-up learning value to a higher value when the lock-up clutch is slipped and released from engagement by the intervention of engine auxiliary equipment load during the coasting open-control state.

* * * * *